No. 624,298. Patented May 2, 1899.
E. CHILDS & W. SANGSTER.
APPARATUS FOR MANUFACTURING TOE CALKS.
(Application filed Dec. 22, 1897.)

(No Model.) 6 Sheets—Sheet 1.

Witnesses:
Fred S. Greenleaf
Edward F. Allen

Inventors:
Eugene Childs.
William Sangster.
by Crosby Gregory attys.

No. 624,298. Patented May 2, 1899.
E. CHILDS & W. SANGSTER.
APPARATUS FOR MANUFACTURING TOE CALKS.
(Application filed Dec. 22, 1897.)
(No Model.) 6 Sheets—Sheet 3.

No. 624,298. Patented May 2, 1899.
E. CHILDS & W. SANGSTER.
APPARATUS FOR MANUFACTURING TOE CALKS.
(Application filed Dec. 22, 1897.)
(No Model.) 6 Sheets—Sheet 4.

Witnesses:
Fred A. Greenleaf
Edward F. Allen

Inventors.
Eugene Childs.
William Sangster.
by Charles Gregory
attys.

THE NORRIS PETERS CO., PHOTO-LITHO., WASHINGTON, D. C.

No. 624,298. Patented May 2, 1899.
E. CHILDS & W. SANGSTER.
APPARATUS FOR MANUFACTURING TOE CALKS.
(Application filed Dec. 22, 1897.)
(No Model.) 6 Sheets—Sheet 5.

Witnesses:
Fred S. Greenleaf
Edward F. Allen

Inventors.
Eugene Childs.
William Sangster.
by Crosby Gregory
attys.

No. 624,298. Patented May 2, 1899.
E. CHILDS & W. SANGSTER.
APPARATUS FOR MANUFACTURING TOE CALKS.
(Application filed Dec. 22, 1897.)

(No Model.) 6 Sheets—Sheet 6.

UNITED STATES PATENT OFFICE.

EUGENE CHILDS AND WILLIAM SANGSTER, OF BOSTON, MASSACHUSETTS, ASSIGNORS OF ONE-THIRD TO EDWARD O. ELY, OF SAME PLACE.

APPARATUS FOR MANUFACTURING TOE-CALKS.

SPECIFICATION forming part of Letters Patent No. 624,298, dated May 2, 1899.

Application filed December 22, 1897. Serial No. 662,992. (No model.)

*To all whom it may concern:*

Be it known that we, EUGENE CHILDS and WILLIAM SANGSTER, of Boston, county of Suffolk, and State of Massachusetts, have invented an Improvement in Apparatus for the Manufacture of Toe-Calks, of which the following description, in connection with the accompanying drawings, is a specification, like letters and figures on the drawings representing like parts.

Our invention is an improvement in machines for automatically forging toe-calks for horseshoes, and has for its primary object the production of toe-calks with extreme rapidity, further objects being the reduction of expense, economizing of power, avoidance of waste of stock, and the production of an improved calk.

The details of construction of our invention and further advantages thereof will be fully described hereinafter, reference being had to the accompanying drawings, illustrative of a preferred embodiment of the invention, and the latter will be more particularly defined in the appended claims, also forming a part of this specification.

In the drawings, Fig. 5ª is a broken detail in front elevation, illustrating the relation of the blank stop and guide to the blank-carrier.

Figure 20:
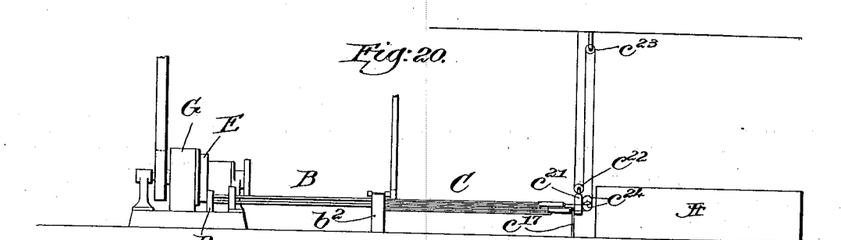
Fig. 20 is a view in elevation illustrating the general arrangement of the plant.

Referring to Fig. 20, the general plan of our invention will be seen to comprise a furnace A of any suitable construction, in which the bars are heated which are to be transformed into completed toe-calks by our machine, the bars being transferred from the furnace A to bar-carrying devices B, whence they are automatically fed by a pushing mechanism C to a shearing mechanism D, the blanks formed thereby being thence transferred to an anvil or blank carrier E to be operated upon by forming mechanism G, all of the mechanism mentioned being preferably entirely automatic.

Figure 25:
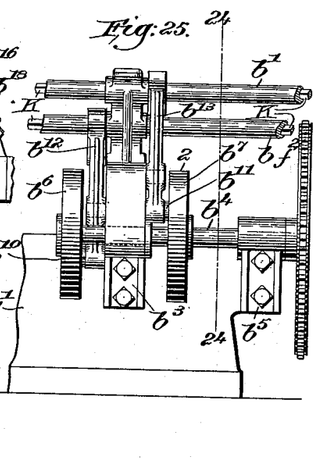
Fig. 25 is a front elevation viewing Figs. 1 and 24 from the left.
Figures 26, 27:
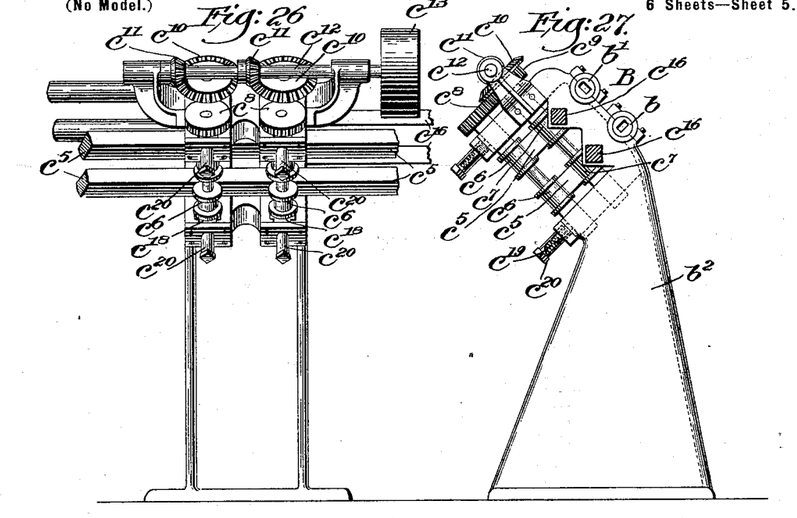
Fig. 26 is a broken detail in front elevation, showing the feeding mechanism.
Fig. 27 is an end elevation thereof looking at Fig. 26 from the right.
Figure 28:
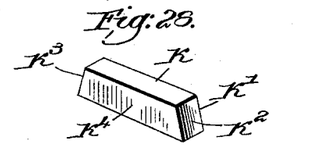
Figs. 28 to 35 are perspective views illustrating the successive shapes assumed by the blank in the manufacture of our improved toe-calk.

Referring to Figs. 26 and 27, we have shown two carrier-bars $b\ b'$, each in the form of a tube provided with a longitudinal passage rectangular in cross-section corresponding in shape and approximately in size to the bars K which are to be transported therethrough and to be manufactured into calks, said bars being shown therein in Fig. 25. These bar-carriers $b\ b'$ are mounted adjacent and parallel to each other in stands $b^2\ b^3$, the latter stand containing mechanism (see Figs. 21 to 25) for reciprocatingly rocking the carriers $b$ $b'$ and thereby laying the respective bars carried thereby first with one side uppermost and then with the opposite side uppermost in order that the blanks cut may have the desired reversely-beveled ends, as shown in Fig. 28.

The rocking mechanism, as herein shown, will be understood viewing Figs. 21 to 25, where it will be seen that the main driving-shaft F of the machine is provided with a sprocket-pinion $f$ and chain $f'$, passing over a sprocket-wheel $f^2$ on the end of a shaft $b^4$, journaled in the stand $b^3$ and adjacent stand $b^5$, secured to the bed $f'$ of the machine. The shaft $b^4$ carries opposite cam-wheels $b^6\ b^7$, having opposite face path-cams $b^8\ b^9$, (shown in detail in Figs. 22 and 23,) in which travel rolls $b^{10}\ b^{11}$, carried in the free ends of segmental arms $b^{12}\ b^{13}$, pivoted at $b^{14}\ a^{15}$ to the stand $b^3$, and carrying segmental racks $b^{16}\ b^{17}$ at their rear ends in engagement, respectively, with cog-pinions $b^{18}\ b^{19}$, fast on the bar-carriers $b\ b'$. By this means the carriers $b\ b'$ are alternately rocked back and forth, so as to permit a cut to be made in one direction and then in the reverse direction as the bars are fed forward, the feeding mechanism hereinafter described serving to feed forward one bar and then the other to the shearing mechanism. The latter in a preferred embodiment is shown in Figs. 4 and 16 to 19 as in the form of reciprocating slides $d\ d'$, carrying the cutting-dies reciprocable in ways $d^2$ in a plate or frame $d^3$. These dies are preferably of peculiar form, one of them being shown in perspective in Fig. 18, where it will be seen that at its upper end it has an L-offset $d^4$, (see also Fig. 17,) to which is bolted the movable cutting-die proper, $d^5$, which coöperates with a fixed die $d^6$, and at the rear of the offset $d^4$ is an arm $d^7$, which serves to support the extreme end of the blank as the latter is being cut from the bar, as will be clearly understood viewing Fig. 17. An adjustable stop $d^8$, mounted on a threaded stud $d^9$, serves to accurately limit the forward feeding movement of the bar and thereby determine the precise length of the blanks $k$.

The bars K are fed red-hot through their carriers $b\ b'$ and delivered thereby to the dies through openings $d^{10}\ d^{11}$, these openings serving to guide and retain the ends of the bars, and yet being large enough to permit the latter to be half-rotated back and forth, as already described, the bottoms of the openings constituting rests for the free ends of the bars K immediately adjacent the moving dies.

The slides $d\ d'$ are reciprocated by means of toggle-links $d^{12}\ d^{13}$, secured at their opposite ends at $d^{14}$ to a bracket $d^{15}$, bolted to the frame, and at $d^{16}$ to brackets or lugs $d^{17}$, cast on the slides $d\ d'$.

Figures 14, 15, 16, 17, 18, 19:
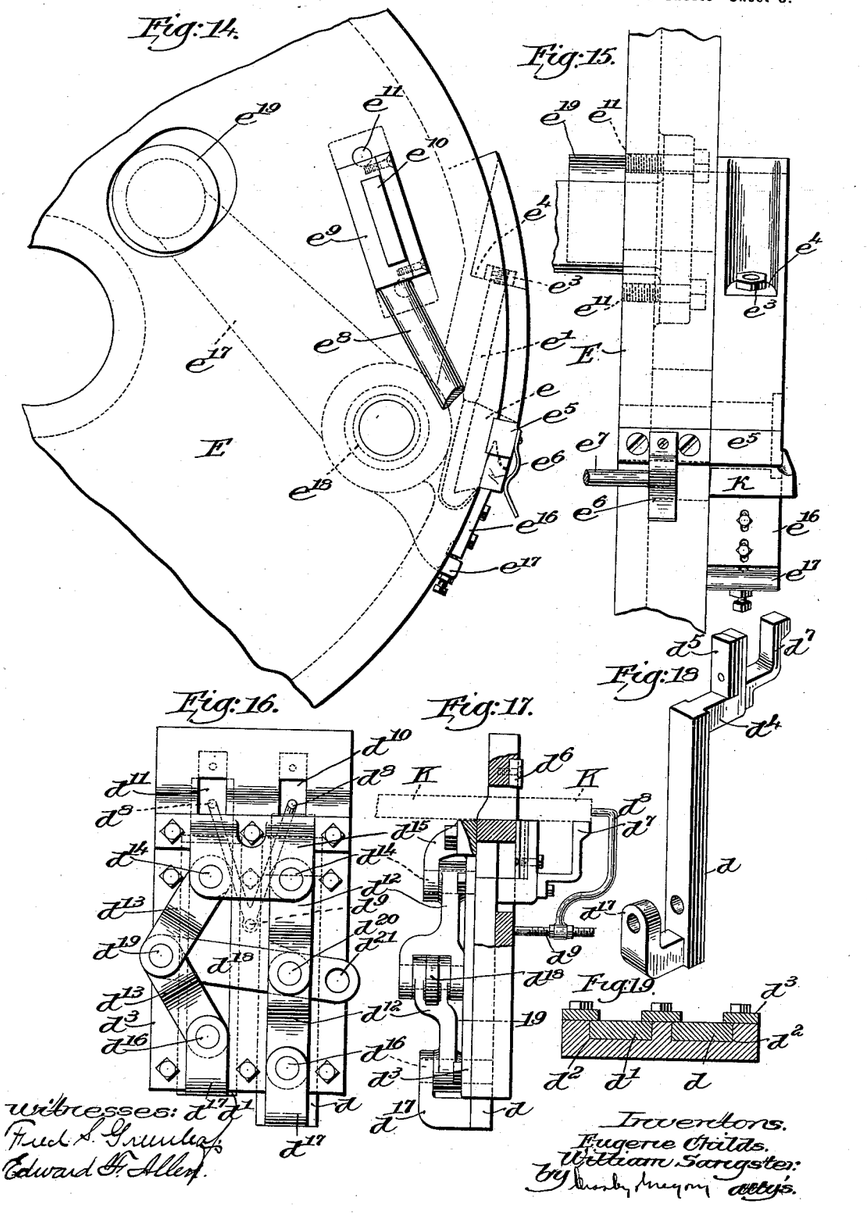
Fig. 14 is an enlarged broken detail of the anvil or blank carrier, viewing the same from the left, Fig. 1, the same as is shown in Fig. 4.
Fig. 15 is a front elevation of the parts shown in Fig. 14, looking toward the left.
Fig. 16 is an enlarged detail in elevation of the shearing mechanism shown in Fig. 4.
Fig. 17 is an end elevation of the parts shown in Fig. 16, looking toward the left.
Fig. 18 is a perspective view of the movable cutting-die.
Fig. 19 is a section on the dotted line 19, Fig. 17.

In order to maintain the greatest speed, we have not only provided two bar-carriers alternately reciprocable and two sets of cutting-dies, as described, but we also construct the shearing mechanism to operate to cut the blanks by the breaking of the toggle, as shown at the left, Fig. 16, inasmuch as the links forming the toggle-joint serve to move their respective slides with greater rapidity when moving away from the dead-center rather than when moving toward it.

Figure 1:
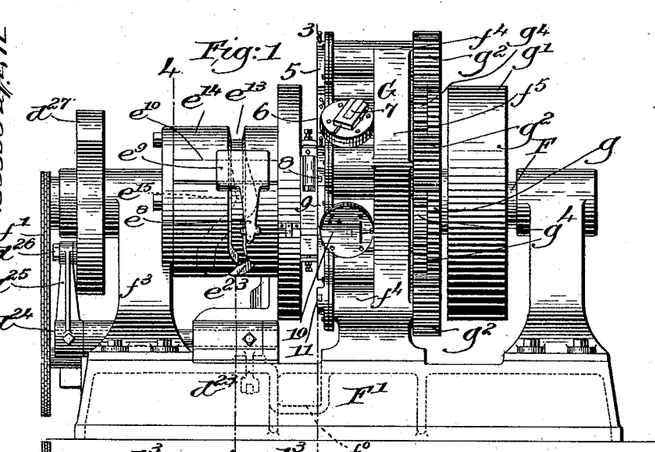
Figure 1 is a view in rear elevation of the main part of the machine.
Figure 4:
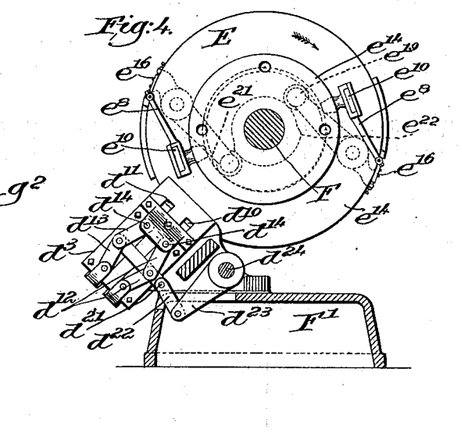
Fig. 4 is a similar sectional view taken on the line 4, Fig. 1.
Figures 5, 5A, 6, 7, 8, 9, 10, 11, 12, 13:
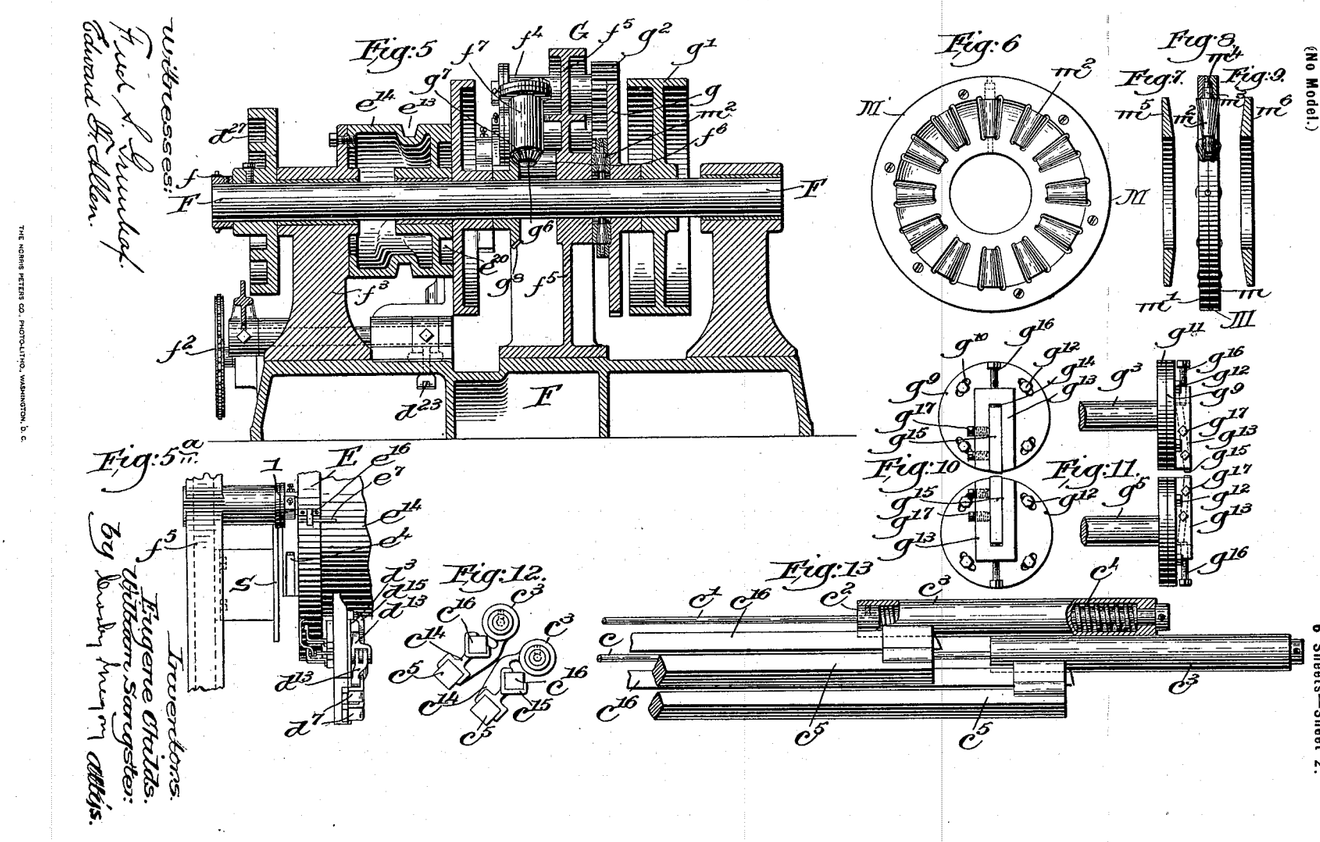
Fig. 5 is a vertical longitudinal section thereof.
Fig. 6 is a detail in elevation of a roller-bearing to take up end thrust.
Figs. 7, 8, and 9 are sectional details, parts being broken away in Fig. 8, showing the adjacent parts of the end-thrust roller-bearing.
Fig. 10 is an enlarged front elevation of a pair of die-heads.
Fig. 11 is a fragmentary detail thereof in side elevation.
Fig. 12 is a view in end elevation and of a part of the feeding mechanism.
Fig. 13 is a fragmentary view, parts being broken away, showing in side elevation the remote end of the feeding mechanism.
Figure 21:
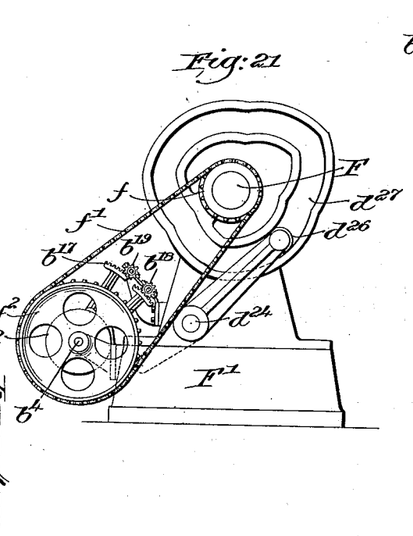
Fig. 21 is a view in end elevation of the mechanism for rocking the bars and bar-carriers of the feeding mechanism, looking at Fig. 2 from the left.
Figures 22, 23, 24:
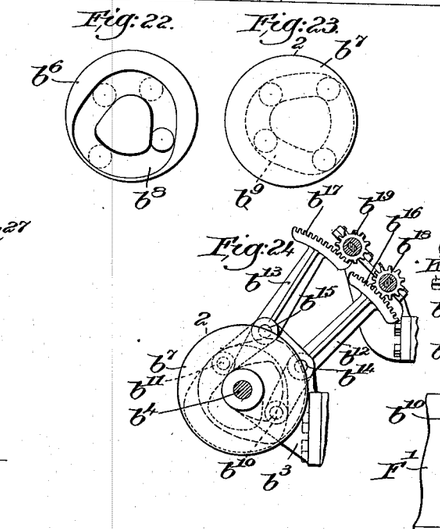
Figs. 22 and 23 are views in elevation of the cam-wheels for operating the rocker-arms thereof.
Fig. 24 is an enlarged detail in vertical cross-section, taken on lines 24 24, Fig. 25.

The two sets of toggles are connected to operate in reverse direction by means of a link $d^{18}$, pivoted thereto at $d^{19}\ d^{20}$ and connected at $d^{21}$ by a link $d^{22}$ to a rocker-arm $d^{23}$, rigid on a shaft $d^{24}$, Figs. 1, 4, and 21, having at its opposite end a lever $d^{25}$, carrying a roll $d^{26}$ in engagement with a heart-cam $d^{27}$, fast on the driving-shaft F.

The bars K are fed to the shearing mechanism alternately, as stated, and in order that the forward ends thereof may always be projected fully against the stops $d^8$ into the positions indicated by dotted lines, Fig. 17, we have not only provided an automatic feeding mechanism, but one in which there is a great capacity for self-regulation, so that inequalities in expansion due to differences in temperature or any other irregularities which are liable to occur in the feeding of the bars will be compensated for.

Referring to Figs. 12, 13, 26, and 27, taken in connection with Fig. 20, it will be seen that the bar-carriers receive the bars from the furnace at their outer ends in the stand $b^2$, the feeding mechanism C, comprising push-rods $c\ c'$, adapted to enter the carriers $b\ b'$ behind the bars and push the latter forward against the stops $d^8$, as already explained. These push-rods are supported at their rear ends by plungers $c^2$, yieldingly reciprocable in barrels $c^3$ by means of coiled springs $c^4$. The barrels $c^3$ are fast on travelers $c^5$, herein shown as square pieces of wood, although they may be of any other form or material desired, and extending forward toward the machine proper between opposite pairs of rolls $c^6\ c^7$, mounted in the stand $b^2$ and positively driven with opposite rotation by means of spur-gears $c^8\ c^9$ and beveled gears $c^{10}$ in mesh with pinions $c^{11}$ on a shaft $c^{12}$, carrying a pulley $c^{13}$, driven from the line-shafting. (Not shown.) The barrels $c^3$ are connected to the travelers $c^5$ by arms $c^{14}$, Fig. 12, each provided with slight recesses $c^{15}$, adapted to reciprocate on guide-bars $c^{16}$, held by a support $c^{17}$, Fig. 20, at one end and by the stand $b^2$ at the other end. The rolls $c^6$ are herein shown as mounted adjacent their ends in movable journal-boxes $c^{18}$, normally held forward in yielding engagement with the travelers $c^5$ by means of springs $c^{19}$, held adjustable in sockets $c^{20}$.

From the above description it will be understood that the constantly-rotating rolls $c^6$ $c^7$ tend to move the travelers forward uniformly; but inasmuch as the push-rods which move the heated bars forward against the stops $d^8$ to be acted on by the shearing devices have necessarily an intermittent forward movement by reason of the halting of the bars while they are being sheared the travelers $c^5$ are thereby caused intermittingly to compress the springs $c^4$ behind the push-rods, and whenever these springs are compressed to a predetermined degree the travelers slip between the rolls $c^6$ and $c^7$, the slipping-point thereof being capable of definite regulation by means of the adjustable springs $c^{19}$, which hold one set of rolls toward the other set of rolls in frictional engagement with the travelers. Thus it is impossible that any false or short blanks should be cut.

Each push-rod is provided with a returning-weight $c^{21}$ on a pulley $c^{22}$, passing over guide-pulleys $c^{23}$ $c^{24}$ for aiding in returning it into its original position.

Figure 2:
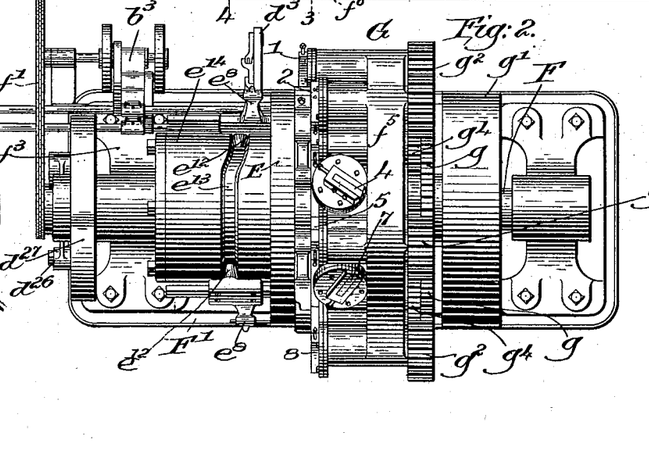
Fig. 2 is a top plan view thereof.
Figure 3:
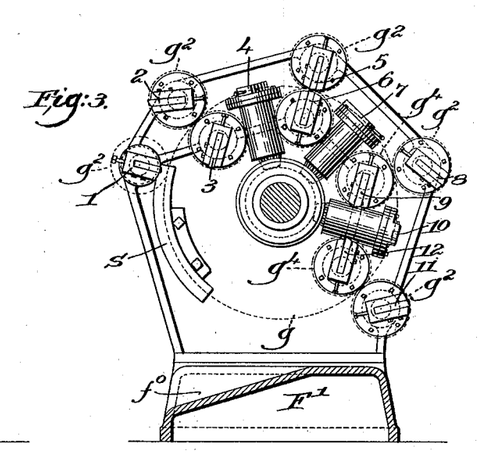
Fig. 3 is a vertical cross-section thereof, taken on the line 3 3, Fig. 1.

Just as the blank $k$ is being finally cut off from the bar K it is received by a blank-carrier, herein shown as movable and as containing two anvils or recesses, Figs. 2 and 4, to hold the blanks while they are being formed, although it will be understood that in this respect our invention is not limited, but includes any means for retaining the blanks and includes any number of these devices which we have herein chosen to call "anvils."

The details of construction of the blank-carrier and its anvil are shown in enlarged view in Figs. 14 and 15, these views showing the position of the parts after a blank has been partially formed. In the peripheral face of the carrier, which is herein shown as a hollow wheel or disk mounted on the drive-shaft F, we secure a block $e$, herein shown as held in a transverse dovetailed way by means of a draw-bolt $e'$, set up by a nut $e^3$, bearing against a shoulder $e^4$, and on the top of this block we secure a shouldered block $e^5$, the forward face of the block $e^5$ and the adjacent outer face of the block $e$ constituting the pocket or recess of the anvil, in which a blank $k$ is held during the forming operation. A leaf-spring $e^6$ at one end of the blank-recess last mentioned projects forward, as shown in Fig. 14, in the path of the blank being cut from the bar K, this spring constituting a movable retaining device to receive and retain the blank on the anvil, said spring having its path of movement in line with the space between the arm $d^7$ and the die $d^5$, Fig. 17, so that as the said arm and die carry the blank forward adjacent the blank-carrier E the spring $e^6$ slides over and retains the blank just as it is being finally sheared from its bar, the blank being firmly supported, until caught by the spring $e^6$, by the arm $d^7$ and the end of the offset $d^4$, which are beneath it. (See Figs. 4, 17, and 18.) The blank is momentarily held in the position last mentioned on the periphery of the blank-carrier E and is then pushed over to the right, Fig. 15, by a positioning device in the form of a finger $e^7$ on the end of an arm $e^8$ of a slide $e^9$, supported on a slideway $e^{10}$, secured by bolts $e^{11}$ rigidly to the blank-carrier E. The slide $e^9$ is provided with a roll $e^{12}$ on its under side, which travels in a stationary cam-groove $e^{13}$, formed in a drum $e^{14}$, rigidly secured to an end bearing $f^3$ of the frame of the machine. The cam-groove $e^{13}$ has an offset $e^{15}$, which at the proper moment moves the slide $e^9$ forward on its way $e^{10}$, and thereby causes the finger $e^7$ to shove forward the blank $k$ just deposited in the recess on the anvil beneath the spring $e^6$, as described, and upon the proper positioning of the blank thus a clamping-plate $e^{16}$, adjustably carried at the end of a powerful lever $e^{17}$, pivoted at $e^{18}$ on the blank-carrier, is moved forward to clamp the blank in place, this clamping movement being herein shown as accomplished by a roll $e^{19}$ on the inner end of the lever $e^{17}$, which travels in a proper cam-groove $e^{20}$ in the face of the drum $e^{14}$, the shape of this cam-groove being indicated in dotted lines in Fig. 4 and its relative position being clearly shown in Fig. 5, where it will be seen that the lever $e^{17}$ is moved into clamping position by an offset $e^{21}$, and so remains until released by an offset $e^{22}$. It will thus be seen that the blank is rigidly held in a vise-like grip between the block $e^5$ and the plate $e^{16}$, as described. The timing of the movements of the parts is such that the blank-carrier brings one of its anvils beneath each blank just as the latter is cut off from the bar K, the mechanism described immediately grasping the blank, positioning it, and immovably gripping it to be acted upon by the forming mechanism. The blanks are held firmly gripped as they pass under the train of forming mechanism, as presently described, and having been completely formed the roll $e^{19}$ of the clamping-lever $e^{17}$ engages the offset $e^{22}$ last mentioned, thereby releasing the blank from its gripped position, and thereupon the positioning-finger $e^7$, acting as a delivering device, is quickly actuated by an offset $e^{23}$ of the cam-groove $e^{13}$, (see Fig. 1,) so as to give the blank a sufficient blow or movement to dislodge it from the carrier and permit it to drop by gravity onto a chute or into a receptacle on the base F', preferably on an incline $f^0$ thereof.

The forming mechanism is herein shown as comprising a plurality of die-holders, which are preferably rotary in their action, by which we mean that they have a circular movement which may be more or less limited in amplitude, although herein shown as a complete continuous rotation.

Referring to Figs. 1 to 5, 10, and 11, $g$ designates a gear fast on the drive-shaft next to a suitable driving-pulley $g'$ and in mesh with a plurality of cog-pinions $g^2$, (indicated by dotted lines, Fig. 3,) these pinions being mounted on shafts $g^3$, firmly journaled in hub-like bearings $f^4$ on a heavy web or bridge-piece $f^5$ of the frame. The pinions $g^2$ are wider than the gear $g$, being shown as substantially double the width thereof, in order that they may mesh with and drive a second set of pinions $g^4$ and shafts $g^5$, herein shown as concentrically mounted in bearings $f^6$ in the web $f^5$, similar to the bearings $f^4$, already described. The web $f^5$ also contains radially-extended bearings $f^7$, which support shafts $g^6$, rotated by bevel-pinions $g^7$, in mesh with a beveled gear $g^8$, fast on the drive-shaft F. At their outer ends the shafts $g^3$ $g^5$ $g^6$ above mentioned are provided with suitable die-carriers, herein shown as all substantially similar, and therefore a description of one will serve for all. These die carriers or heads are shown in enlarged detail in Figs. 10 and 11, and each comprises a face-plate $g^9$, provided with elongated slots $g^{10}$ for proper adjustment on and to be secured against a head-plate $g^{11}$ by bolts $g^{12}$, said face-plate $g^9$ being provided with ribs $g^{13}$, forming a way $g^{14}$ for a forming-die $g^{15}$, adjustable therein by means of bolts $g^{16}$ $g^{17}$. Said forming-die $g^{15}$ is firmly held in its adjustment, so as to coöperate with an opposite forming-die where they are arranged in pairs. The successive dies and pairs of dies are shaped to draw out and form the calk, as shown in Figs. 28 to 35, as will be more particularly explained later on.

While we have constructed and arranged the parts, as already described, to position the blanks with substantial accuracy, yet as a further precaution we prefer to employ a guide and stop S, (shown in detail in Fig. 5$^a$,) secured to the web $f^5$ and projecting in front of the path of the inner or overhanging ends of the blanks $k$, so that as the fingers $e^7$ shove the blanks forward into position they are stopped with absolute precision by the stop S, which also serves to guide them until they come beneath the die 1. It will be observed that this die projects over the body of the blank on the anvil. One main purpose of die 1 is to press the blank firmly into its recess, the clamping-plate $e^{16}$ being at that moment moved into clamping position.

In order to take up the considerable end thrust which exists in our machine as we have herein shown and explained it, we provide thrust roller-bearings. (Shown in detail in Figs. 6 to 9.) In a spider or annular plate M, herein shown as made up of two parts $m$ $m'$, we mount a plurality of radial rollers $m^2$, having an outer shouldered bearing $m^3$, resting against a hardened steel block $m^4$, said rollers bearing against a stationary wear-plate $m^5$ on the rib $f^5$ and a movable wear-plate $m^6$ against the gear-wheel $g$.

We have explained above in detail the construction of our machine and its preferred embodiment as herein shown; but it will be understood that the various arrangements and relations of parts, as well as the specific details of construction, may be slightly varied within the spirit and scope of our invention.

In order that the operation of our improved machine may be fully understood, we will describe the successive steps in the manufacture of a toe-calk from the start to the finish.

The heated bars which are to be formed into toe-calks are taken alternately from the furnace A and pushed into the bar-carriers $b$ $b'$, these carriers serving to maintain the rods straight and hold in their heat, preventing buckling and wedging. The pushers $c$ $c'$ gradually force forward the rods, tending to maintain them successively in position against the stops $d^8$, and the shearing mechanism cuts off blanks $k$ alternately from one rod and then from the other. We regard the feeding mechanism herein shown as of particular importance in this invention. It is strong and certain in its operation. The feed-rolls $c^6$ $c^7$ are positive in their operation up to a predetermined point, which may be varied at will, and beyond that point they allow the travelers $c^5$ to slip without feeding them, thus holding the springs $c^4$ under a uniform tension ready to project either of the bars K instantly upon the delivery of a blank to the blank-carrier and the restoring of the cutting-die to the position shown in Fig. 17 out of the path of said bar K ready to cut another blank. In other words, the bar K is held forward all the time, and when in the position shown in Fig. 17 it bears against the stop $d^8$, but immediately upon the upward movement of the cutting-die, which carries the blank end of the bar ahead of it. The bar proper as the blank is being severed bears against the inner face of the movable cutting-die $d^5$ and is thereafter held against forward movement by said die while the blank cut is being delivered to the blank-carrier, and also until the cutting-die $d^5$ and supporting-arm $d^7$ move down again out of the way of the bar, whereupon it is instantly projected against the stop $d^8$ ready to be immediately sheared off again for the formation of another blank $k$. This operation proceeds with extreme rapidity, the successive blanks being alternately formed by quick movements on the breaking of the toggle from the position shown at the right, Fig. 16, to the position shown at the left.

Our object is to gain speed at every point and withal to insure accuracy and certainty, so that no false cuts or movements shall be made. The shape and positions of the cutting-dies are such that, presupposing the bar to lie with its side $k'$, Fig. 28, lowermost, one cut, $k^2$, will be at an angle, as shown in Fig. 28, and in order that the next cut, $k^3$, may be at a reverse angle, as shown in Fig. 28, the corresponding racks $b^{16}$ $b^{17}$, Figs. 21 to 25, serve to rock the bar and its carrier one-half rotation immediately upon the cut $k^2$ being made, so that the bar is turned over in the recess $d^{10}$ or $d^{11}$, as the case may be, so as to bring its side $k^4$ lowermost into the position previously occupied by the side $k'$. This rocking movement may take place simultaneously with the forward movement of the bar, previously or subsequently thereto, as desired under the particular circumstances.

In Fig. 21 we have shown the rocking and shearing mechanisms connected by a sprocket-chain, this provision insuring that there shall be absolute precision of movement one relatively to another; but it will be understood that any other suitable connection or relative arrangement of these mechanisms may be substituted without departing from this part of our invention, broadly considered.

Viewing Fig. 4, it will be seen that the position and arrangement of the shearing mechanism are such as to afford a firm support to the blanks after they are cut from the bars K. We have chosen in this preferred form of our invention to make the shearing mechanism stationary relatively to the blank-forming mechanism and have made the latter movable, this being a compact and convenient arrangement, and we have chosen to give the blank-carrier a rotary movement, preferably continuously in one direction. Accordingly the blank being held up at both ends by the cutting-die and the supporting-arm carried thereby, as herein shown, and the blank-carrier E being rotated in the direction of the arrow, Fig. 4, it will be clear that the spring $e^6$, Fig. 14, will come against the blank from the under side of the latter, and this takes place preferably just as the blank is being finally severed, so that the instant that the block $e^5$ strikes against the side of the blank the latter is free to move ahead with the carrier under the retaining-pressure of the spring $e^6$, and preferably also simultaneously with this movement the finger $e^7$ is moved to the right, Figs. 2 and 15, by the engagement of the roll $e^{12}$ of its slide $e^9$ with the offset $e^{15}$ of the stationary frame $e^{14}$, thereby pushing the blank forward along the adjacent surfaces of the anvil-blocks $e\ e^5$ the precise distance required, so as to leave just the amount of metal overhanging the far edge thereof which is required for the subsequent forming of the calk, accuracy being further insured by the guide and stop S, against which the blank may strike.

It will be understood from the description thus far that all the blanks must necessarily be absolutely uniform in every respect, inasmuch as the mechanism is so constructed, as already fully explained, that every blank is treated precisely the same, and the movements in every respect are absolutely alike for the successive blanks.

The blank having been properly positioned, as stated, is thereupon pressed down into its seat by the overhanging die 1 and immovably gripped by the clamping-plate $e^{16}$, actuated by the cam-groove $e^{20}$, operating on the roll $e^{19}$ of the lever $e^{17}$, being thereafter held rigidly thereby as it is carried around to be operated upon by the successive forming-dies.

One object of our invention is to form the calk by working and drawing the metal forward, so as to lay its grain properly for the greatest strength and without offsetting the grain of the metal at the base of the calk, and thereby render it brittle at that point, so as to be liable to break off easily, as has heretofore frequently resulted in machine-made calks, our invention drawing the metal forward a little at a time, as distinguished from spreading it in all directions, as by a blow with a flat surface. This feature of our invention also insures less noise, requires less power, and produces a neater and more perfect calk, besides giving absolute uniformity of product.

We have shown the forming-dies as continuously rotated, this being a preferable motion in connection with the continuous rotation of the die-carrier; but it will be understood that we are not limited in this respect, inasmuch as an oscillating or any other movement may be employed.

Figure 29:
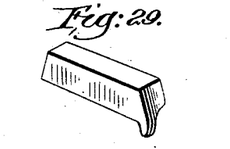
Figure 30:
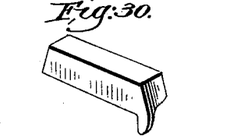
Figure 31:
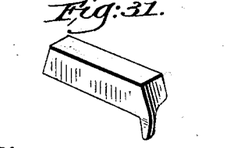
Figure 32:
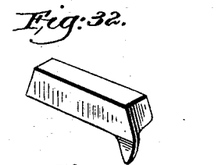
Figure 33:
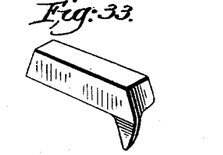
Figure 34:
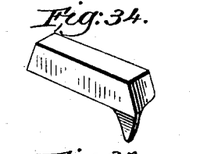
Figure 35:
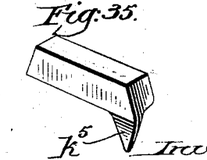
Figure 36:
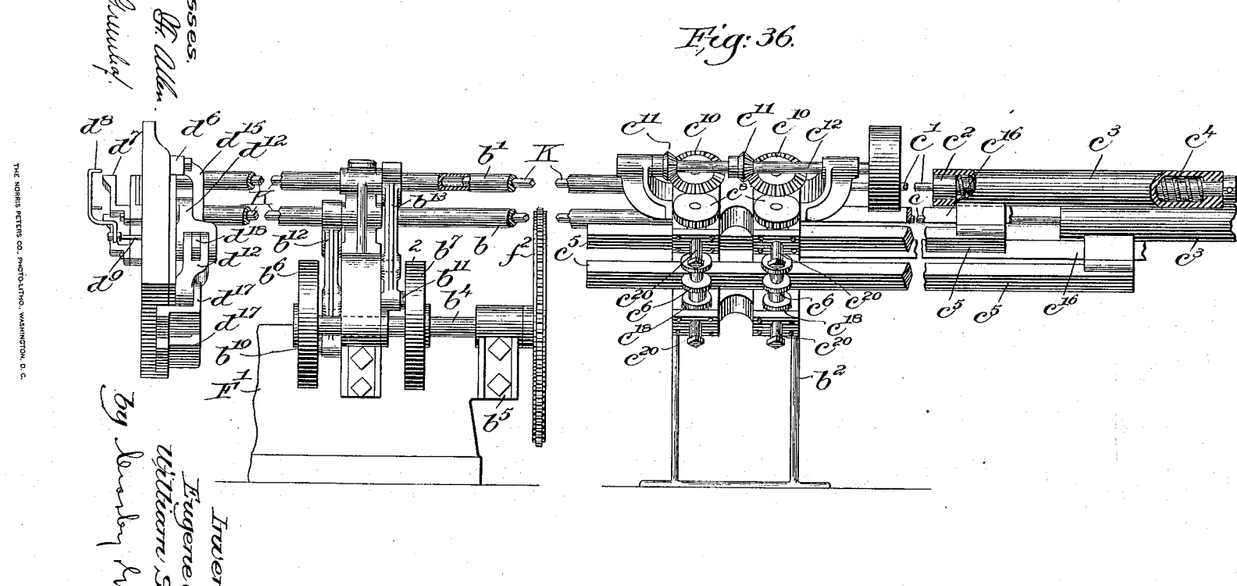
Fig. 36 shows in elevation, parts being broken out, the leading features of the feeding mechansm of our apparatus.

The blank carried on the anvil by the blank-carrier is first acted upon simultaneously by the dies 2 3 and brought thereby into the form shown in Fig. 29, these dies serving to produce a projecting nib or prong by crowding forward the metal thereof by a simultaneous pressure on the opposite sides of the calk. As the blank moves forward it is next worked by die 4, which crowds down the end of the calk against the end of the anvil, and thereby tends to sharpen, as well as to elongate, the prong or point to the form shown in Fig. 30, whereupon it is again operated upon by the dies 5 6, which act in the same manner as the previous pair of dies and simultaneously elongate and slightly thin down the point into the form shown in Fig. 31. The next die 7 crowds down the end of the point, slightly sharpening it to the form Fig. 32, and the following pair of dies 8 9 again thin down and elongate the point with sidewise pressure to the form shown in Fig. 33. Then die 10 again sharpens the point with an endwise pressure and brings it into the shape shown in Fig. 34, whereupon the dies 11 and 12 finally shape it into the form shown in Fig. 35. It will thus be seen that the grain of the metal is not violently disturbed at any step of the process; but the metal is gradually drawn out by a series of alternate side pressures and end pressures, one succeeding the other with extreme rapidity.

We prefer the rotary movement, inasmuch as thereby greater rapidity can be maintained in the form of machine in which we have herein chosen to embody our invention, and we prefer to have the blanks carried around beneath the forming-dies, the latter remaining stationary relatively to each other and to the general movement of the blank-carrier; but we consider it within our invention to reverse these movements or to substitute others therefor.

We consider it broadly new to provide automatic means for working the metal of the calk forward continuously and evenly; also, we consider it broadly new to provide an automatic feed whereby the machine feeds itself. All these general features of our invention not only conduce to extreme rapidity of output, but are of material advantage in economy of operation.

We consider it of decided advantage, especially by reason of the superior calk produced thereby, to have no spreading-out blows delivered on the metal, but instead thereof to have solely a working and drawing action.

While we have herein shown and desire to retain our invention in one unitary machine, as herein shown, it will be understood that certain features of our invention are capable of being used in connection with other machines and that other mechanisms for performing certain functions of the present machine may be substituted therefor, it being our intention that the present invention shall not be otherwise limited than as hereinafter expressed in the claims.

Having described our invention, what we claim as new, and desire to secure by Letters Patent, is—

1. A machine for making toe-calks, comprising means to hold a blank, and mechanism for forming a calk from said blank, said mechanism including automatic means for working the metal by a series of side rolling pressures and end pressures in alternate succession, substantially as described.

2. In a machine for making toe-calks, a blank-carrier provided with a plurality of anvils, means to deliver separate blanks to said anvils and their ends slightly projecting thereover, mechanism for forming calks from said blanks, said mechanism including automatic means for working the metal by a series of side pressures and end pressures in alternate succession, and means for relatively moving said blank-carrier and forming mechanism, whereby the end of each blank receives successively said pressures, substantially as described.

3. In a machine for making toe-calks, a blank-carrier, means for feeding separate blanks thereto, means to clamp said blanks in place on the carrier, means maintaining said clamp in rigid clamping engagement with the blanks until the toe-calks are finished, a succession of forming-dies, means for moving said dies with an outward drawing movement over the calk end of the blanks, substantially as described.

4. In a machine of the class described, a plurality of bar-carriers, shearing devices, and forming mechanism, combined with means for automatically feeding the bars alternately in succession to said shearing devices to be cut into blanks for said forming mechanism, substantially as described.

5. In a machine of the class described, a plurality of bar-carriers, shearing devices, and forming mechanism, combined with means for automatically feeding the bars alternately in succession to said shearing devices to be cut into blanks for said forming mechanism, said shearing devices being arranged to cut obliquely across said bars, and means to rock said bars intermittingly, substantially as described.

6. In a machine of the class described, a plurality of bar-carriers, shearing devices, and forming mechanism, combined with means for automatically feeding the bars alternately in succession to said shearing devices to be cut into blanks for said forming mechanism, said means including mechanism for maintaining said bars under a constant tendency to feed forward, substantially as described.

7. In a machine of the class described, a plurality of bar-carriers, shearing devices, and forming mechanism, combined with means for automatically feeding the bars alternately in succession to said shearing devices to be cut into blanks for said forming mechanism, said means including mechanism for maintaining said bars under a constant tendency to feed forward, and means to regulate said tendency, substantially as described.

8. The combination with bar-shearing mechanism and forming mechanism, of means to feed said bars intermittingly to the shearing mechanism, a uniformly-moving driving mechanism, means for continuously moving said driving mechanism, said driving mechanism being connected with and to operate said means for the intermittent feed, the latter feeding intermittingly and the driving mechanism acting continuously, substantially as described.

9. The herein-described feeding mechanism, comprising a bar-carrier to receive bars to be fed, a push-rod to feed said bars, positive driving means for actuating said rod, and an intermediate yielding connection between said rod and driving means whereby an intermittent movement of the rod is permitted without requiring a corresponding movement of the driving means, substantially as decribed.

10. The herein-described feeding mechanism, comprising a bar-carrier to receive bars to be fed, a push-rod to feed said bars, positive driving means including opposite rolls, a traveler held between said rolls and moved longitudinally thereby, and a spring connection between said traveler and said rod, substantially as described.

11. The herein-described feeding mechanism, comprising a bar-carrier to receive bars to be fed, a push-rod to feed said bars, positive driving means including opposite rolls, a traveler held between said rolls and moved longitudinally thereby, a spring connection between said traveler and said rod, and means to regulate the pressure of said rolls on said traveler, substantially as described.

12. The combination with a long, tubular bar-carrier, having substantially the same angular shape and size of cavity throughout its length, said angular shape corresponding in cross-section to the bar to be fed therein, and a push-rod operating in said carrier, of means to intermittingly move said push-rod progressively in the carrier, and means to intermittingly give said carrier a partial rotation, substantially as described.

13. The combination with two long, tubular bar-carriers to receive and retain the heat of bars to be fed therein, said carriers having substantially the same angular shape and size of cavity throughout their entire length, a push-rod for and operating in each carrier, and means to intermittingly move said bars progressively in said carrier, of means alternately to partially rotate said bars, substantially as described.

14. The herein-described shearing apparatus comprising a plate, a slide reciprocable therein, said slide carrying a cutting-die at its forward end, said plate having a fixed die to coöperate therewith, a toggle-lever having one of its links pivoted on said plate adjacent the die end of said slide and its other link pivoted on said slide remote from the die end thereof, and means to straighten and break said toggle, whereby said toggle actuates said slide for its cutting operation on the breaking movement of said toggle, substantially as described.

15. The herein-described shearing apparatus, comprising a plate having a way therein, a fixed cutting-die, an opening to receive a bar to be cut, and a rest for said bar, and a slide reciprocable in said way, said slide having an L offset provided with a movable die coöperating with said fixed die, substantially as described.

16. The herein-described shearing apparatus, comprising a plate, a slide movable therein, said plate having a fixed cutting-die and said slide having a movable cutting-die to coöperate therewith, and a supporting-arm carried by and moving with said slide, said supporting-arm engaging and supporting the free end of the blank as it is being cut from a bar and said slide and its cutting-die supporting the inner end of the blank, and means to actuate said slide, substantially as described.

17. The herein-described shearing apparatus, comprising a plate, a slide movable therein, means to actuate said slide, a fixed cutting-die carried by said plate, a movable cutting-die carried by said slide to coöperate with the fixed die for cutting a blank from a bar, and an adjustable stop to limit the forward movement of the bar and determine the length of the blank to be cut by said dies, substantially as described.

18. The herein-described shearing apparatus, comprising a plate, a slide movable therein, means to actuate said slide, a fixed cutting-die carried by said plate, a movable cutting-die carried by said slide to coöperate with the fixed die for cutting a blank from a bar, an adjustable stop to limit the forward movement of the bar and determine the length of the blank to be cut by said dies, and a supporting-arm carried by and in line with said movable cutting-die, said arm and die supporting the respective ends of the blank as the latter is cut from a bar, substantially as described.

19. The herein-described shearing apparatus, comprising a plate, two ways therein, a slide for each way, each slide having a cutting-die at one end, a fixed cutting-die on said plate to coöperate with each movable die, a toggle-lever for each slide, said toggle-levers being connected to said plate at the die end of the slides and to the latter at their other ends, a link connecting said toggle-levers together at their joints so that one toggle is broken when the other is straight, and means to actuate said link whereby said slides are alternately reciprocated and are moved for the cutting operation on the breaking of their respective toggles, substantially as described.

20. The combination with an anvil, a movable retaining device to receive and retain a blank on said anvil, a positioning device, and means to operate the latter for accurately positioning the blank on and relatively to the anvil, substantially as described.

21. The combination with an anvil, a movable retaining device to receive and retain a blank on said anvil, a positioning device, and means to operate the latter for accurately positioning the blank relatively to the anvil, a clamp, and means to actuate it to grip said blank and hold it immovable after it has been positioned, substantially as described.

22. In a machine of the class described, a drum and a blank-carrier relatively rotatable, said carrier being adapted to receive blanks and retain the same, said drum having a cam-groove, a positioning device for accurately adjusting the blanks in position on said carrier, said positioning device being actuated by said cam-groove, substantially as described.

23. In a machine of the class described, a stationary drum, and a rotatable blank-carrier, the latter provided with means for supporting blanks, and carrying a positioning device movable laterally thereto to position the blanks, said drum having a cam-groove for actuating said positioning device, and a clamp pivotally supported on said carrier and means to actuate it to grip the blanks, substantially as described.

24. The combination with an anvil adapted to support a blank to be formed, of a positioning device to place the blank in position on the anvil, a stop to limit the movement of the blank by said positioning device, a clamp and means to actuate said clamp to grip the blank and hold it for forming, substantially as described.

25. A blank-carrier, means for positioning blanks thereon, a stop to limit the movement of the blanks under the action of said positioning device, means to press said blanks against said carrier, and a clamp to keep the blanks so pressed, substantially as described.

26. A machine of the class described, composed of a blank-carrier adapted to receive and support a plurality of blanks, clamps to grip and hold said blanks immovably on said blank-carrier, means to actuate said clamps, and a plurality of forming devices, said forming devices and blank-carrier being relatively movable whereby each blank is progressively operated upon by all of said forming devices, substantially as described.

27. A machine of the class described, composed of a blank-carrier adapted to receive and support a plurality of blanks, clamps to grip and hold said blanks immovably on said blank-carrier, means to actuate said clamps, and a plurality of forming devices, said forming devices and blank-carrier being relatively movable whereby each blank is progressively operated upon by all of said forming devices, and means to give said forming devices an individual rotary movement, substantially as described.

28. A machine of the class described, composed of a blank-carrier adapted to receive and support a plurality of blanks, clamps to grip and hold said blanks immovably on said blank-carrier, means to actuate said clamps, and a plurality of forming devices, said forming devices and blank-carrier being relatively movable whereby each blank is progressively operated upon by all of said forming devices, said forming devices being arrranged successively singly and in pairs whereby the blank is operated upon alternately by a single forming device and by a pair of coöperating forming devices, substantially as described.

29. A machine of the class described, composed of a blank-carrier adapted to receive and support a plurality of blanks, clamps to grip and hold said blanks immovably on said blank-carrier, means to actuate said clamps, and a plurality of forming devices, said forming devices and blank-carrier being relatively movable whereby each blank is progressively operated upon by all of said forming devices, said forming devices being arranged successively singly and in pairs whereby the blank is operated upon alternately by a single forming device and by a pair of coöperating forming devices, means to give the forming devices composing said pairs rotative movement in opposite directions, substantially as described.

30. A machine of the class described, composed of a blank-carrier adapted to receive and support a plurality of blanks, clamps to grip and hold said blanks immovably on said blank-carrier, means to actuate said clamps, and a plurality of forming devices, said forming devices and blank-carrier being relatively movable whereby each blank is progressively operated upon by all of said forming devices, said forming devices being arranged successively singly and in pairs whereby the blank is operated upon alternately by a single forming device and by a pair of coöperating forming devices, and means to give said forming devices an individual rotary motion in the direction of relative movement of said blanks, substantially as described.

31. A machine for making toe-calks, comprising means to support the blanks to be formed into toe-calks and forming mechanism to operate on the side of the toe-calk, means to move said toe-calk relatively to said side forming mechanism, forming mechanism to operate on the end of the toe-calk, and other forming mechanisms to operate subsequently on the side of the toe-calk and again on the end thereof, and means to successively present the toe-calk to said several different forming mechanisms, substantially as described.

32. A machine for making toe-calks, comprising a blank-carrier, means to rotate it, a plurality of shafts mounted in fixed bearings approximately at right angles to the plane of movement of said carrier, each shaft being provided with a transverse head carrying a forming-die, said forming-dies projecting into the path of movement of said blanks, and means to communicate rotary movement to said shafts, substantially as described.

33. A machine for making toe-calks, comprising a blank-carrier, means to rotate it, a plurality of shafts mounted in fixed bearings approximately at right angles to the plane of movement of said carrier, each shaft being provided with a transverse head carrying a die, said dies projecting into the path of movement of the said blanks, the first of said dies projecting over said carrier and the blanks thereon farther than the others of said dies to press the blanks against the carrier, a clamp to grip said blanks as the latter pass under said last-mentioned die, and means to communicate rotary movement to said shafts, substantially as described.

34. A machine for making toe-calks, comprising a blank-carrier, means to rotate it, a plurality of shafts mounted in pairs approximately at right angles to the plane of movement of said carrier, each shaft being provided with a transverse head carrying a forming-die, said forming-dies projecting into the path of movement of the said blanks, one of each pair on opposite sides of the blank, the dies of each pair being respectively rotated in opposite directions, substantially as described.

35. A machine for making toe-calks, comprising a blank-carrier, means to rotate it, a plurality of shafts mounted in fixed bearings approximately at right angles to the plane of movement of said carrier, each shaft being provided with a transverse head carrying a forming-die, said forming-dies projecting into the path of movement of the said blanks, and means to communicate rotary movement to said shafts, and shafts mounted in fixed bearings approximately parallel to the plane of movement of said carrier, said shafts being intermediate the said pairs of shafts and each provided with a transverse head and die rotatable in the path of movement of the blanks, substantially as described.

36. In a machine of the class described, a moving blank-carrier, means to deliver blanks thereto, a clamp to clamp said blanks in place on said carrier, forming mechanism to operate on said blanks, means to release said clamp from the blanks after the latter have been operated upon, and a delivery device to automatically remove said blanks from the carrier, substantially as described.

37. In a machine of the class described, a shearing apparatus comprising a fixed and a movable cutting-die, the movable die supporting the blank after it is severed, combined with a rotating blank-carrier, said movable cutting-die supporting the blank in the path of movement of said blank-carrier, and the latter being provided with means for receiving the blank from the cutting-die and retaining it on the carrier, substantially as described.

38. The combination with an anvil adapted to support a blank to be formed, of means to retain a blank on the anvil, a positioning device to position the blank so retained on the anvil, a stop to limit the movement of the blank by said positioning device, a clamp and means to actuate said clamp to grip the blank and hold it for forming, substantially as described.

39. A machine of the class described, composed of a blank-carrier adapted to receive and support a plurality of blanks, anvils on said carriers, one for each blank, clamps to grip and hold said blanks immovably on said blank-carrier against said anvils, means to actuate said clamps, and a plurality of forming devices for shaping the blanks over the anvils, said forming devices and blank-carrier being relatively movable whereby each blank is progressively operated upon by all of said forming devices, substantially as described.

In testimony whereof we have signed our names to this specification in the presence of two subscribing witnesses.

EUGENE CHILDS.
WILLIAM SANGSTER.

Witnesses:
GEO. H. MAXWELL,
EDWARD D. ELY.